(12) United States Patent
Shafer

(10) Patent No.: US 8,323,495 B2
(45) Date of Patent: Dec. 4, 2012

(54) METHOD OF OPERATING A BIOREACTOR AND FILTRATION SYSTEM

(75) Inventor: Lee L. Shafer, Big Piney, WY (US)

(73) Assignee: Anticline Disposal, LLC, Boulder, WY (US)

( * ) Notice: Subject to any disclaimer, the term of this patent is extended or adjusted under 35 U.S.C. 154(b) by 459 days.

(21) Appl. No.: 12/714,868

(22) Filed: Mar. 1, 2010

(65) Prior Publication Data

US 2010/0224557 A1    Sep. 9, 2010

Related U.S. Application Data

(60) Provisional application No. 61/157,291, filed on Mar. 4, 2009.

(51) Int. Cl.
*C02F 3/00* (2006.01)

(52) U.S. Cl. .................. 210/609; 210/631; 210/777

(58) Field of Classification Search .................. 210/609, 210/631, 777
See application file for complete search history.

(56) References Cited

U.S. PATENT DOCUMENTS 4,289,736 A * 9/1981 Lalancette .................. 423/158
2008/0237123 A1 10/2008 Marston

OTHER PUBLICATIONS

Fan et al., "Use of Chemical Coagulants to Control Fouling Potential for Wastewater Membrane Bioreactor Processes", Water Environment Research, vol. 79(9), Sep. 2007, pp. 952-957.
Zenon Environmental, Inc. Company Overview Power Point presentation, pp. 1-60, updated as of Nov. 2004.

* cited by examiner

*Primary Examiner* — Chester Barry
(74) *Attorney, Agent, or Firm* — Merchant & Gould, P.C.

(57) ABSTRACT

The disclosure describes a novel method for operating a bioreactor and filtration system. The method adds excess iron to the bioreactor to improve the overall operation and efficiency of the bioreactor/filtration system.

19 Claims, 2 Drawing Sheets

METHOD OF OPERATING A BIOREACTOR AND FILTRATION SYSTEM

RELATED APPLICATIONS

This application claims the benefit of U.S. Provisional Application No. 61/157,291, filed Mar. 4, 2009, and entitled "Method of Operating a Bioreactor and Filtration System" which application is hereby incorporated herein by reference.

INTRODUCTION

A bioreactor aerates biodegradable waste generated by humans and/or other animals, and/or industrial process wastes with waste-degrading microorganisms (or activated sludge). A membrane filtration unit may be utilized to further clean the effluent from the bioreactor. It is known that a membrane filtration device, whether a microfiltration or an ultrafiltration membrane, not only avoids the time penalty of gravity settling technology but also provides a highly effective purification means. Therefore, a bioreactor is often utilized in combination with a membrane filtration unit to purify waste.

Water, especially in the western United States and other arid regions, is a valuable resource. Many oil and natural gas production operations generate, in addition to the desired hydrocarbon products, large quantities of waste water, referred to as "produced water". Produced water is a type of industrial process waste and may be cleaned with a bioreactor and filtration system. Produced water is typically contaminated with significant concentrations of chemicals and substances requiring that it be disposed of or treated before it can be reused or discharged to the environment. Produced water includes natural contaminants that come from the subsurface environment, such as hydrocarbons from the oil- or gas-bearing strata and inorganic salts. Produced water may also include man-made contaminants, such as drilling mud, "frac flow back water" that includes spent fracturing fluids including polymers and inorganic cross-linking agents, polymer breaking agents, friction reduction chemicals, and artificial lubricants. These contaminants are injected into the wells as part of the drilling and production processes and recovered as contaminants in the produced water. Produced water cleaned by a bioreactor and a filtration system may be suitable for being discharged into the environment or reused for industrial purposes.

SUMMARY

The disclosure describes a novel method for operating a bioreactor and filtration system. The method adds excess iron to the bioreactor to improve the overall operation and efficiency of the bioreactor/filtration system.

In part, this disclosure describes a method for operating a bioreactor and filtration system that reduces the fouling of the filtration system. The method includes performing the following steps:
 a) feeding water containing contaminants into a bioreactor system containing live microorganisms, the bioreactor system comprising at least a first bioreactor;
 b) feeding a concentration of iron into the first bioreactor above a stoichiometric requirement for iron in the first bioreactor; and
 c) treating, directly or indirectly, effluent from the bioreactor system with a filtration system to obtain a filtration system effluent substantially free of the contaminants.

The concentration of iron above the stoichiometric requirement fed into the first bioreactor results in a reduction in fouling of the filtration system when compared to utilizing the stoichiometric requirement for iron in the first bioreactor.

Yet another aspect of this disclosure describes a method for operating a bioreactor and filtration system that reduces the fouling of the filtration system. The method includes performing the following steps:
 a) feeding water containing contaminants into a bioreactor system containing live microorganisms, the bioreactor system comprising at least a first bioreactor;
 b) feeding a concentration of iron into the first bioreactor from 150% to 10,000% above a stoichiometric requirement for iron in the first bioreactor; and
 c) treating, directly or indirectly, effluent from the bioreactor system with a filtration system to obtain a filtration system effluent substantially free of the contaminants.

The concentration of iron above the stoichiometric requirement fed into the first bioreactor results in a reduction in fouling of the filtration system when compared to utilizing the stoichiometric requirement for iron in the first bioreactor.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DETAILED DESCRIPTION

Figure 1:
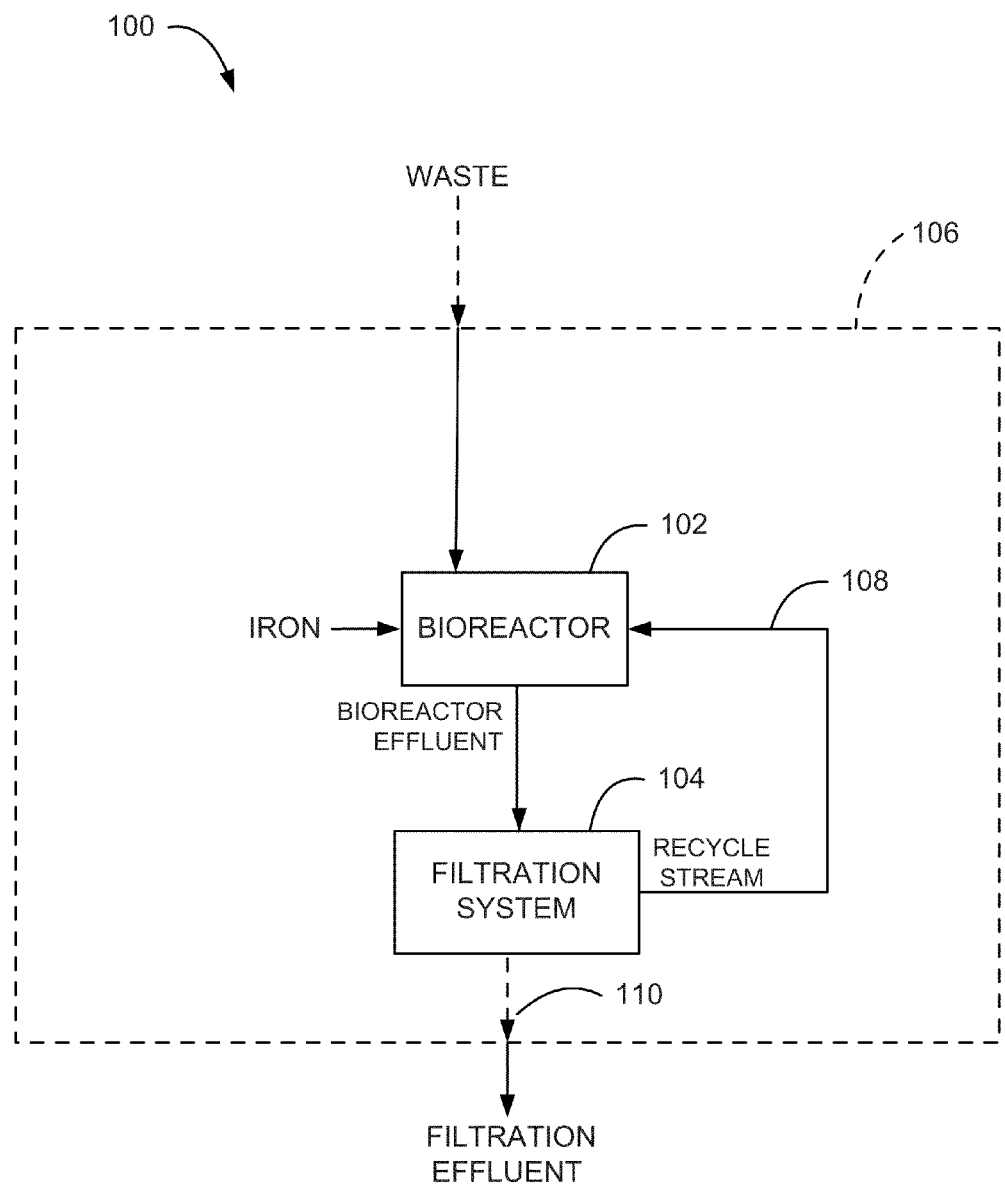
FIG. 1 illustrates an embodiment of a system for treating biodegradable waste according to the principles of the present disclosure.

One aspect of the present disclosure relates to a method for operating a combination bioreactor/filtration system. The method for operating a bioreactor and a filtration system comprises operating the bioreactor and adding an excess of iron which thereby improves the overall operation of the bioreactor/filtration system by preventing/reducing the fouling of the filtration system. Previously, operators have avoided utilizing excess iron when the filtration system is followed by other water treatment steps, because iron is known to foul some water treatment systems.

The present disclosure describes the utilization of iron in concentrations of about 150% to about 10,000% of that which is normally recommended for a healthy microorganism population, which achieves a marked reduction in fouling of the microfiltration membrane. Given that the normally recommended amount of iron in a bioreactor is determined on a stoiciometric basis based on an analysis of how much iron is in a healthy microorganism and, in an embodiment, is about 1% of the dry mass of microorganisms in the bioreactor, the excess iron that could be used to achieve the beneficial filtration effects corresponds to between about 1.5% to 15% to as much as 50% of the dry mass of microorganisms in the bioreactor.

All of the parameters and measurements discussed herein refer to a stable 10,0000 mg/l bug population. However, this population size is not limiting. Any other suitable stable bug population size for operating a bioreactor/filtration system may be utilized in the disclosed method and apparatus by adjusting the iron concentration according to the bug population size utilized.

Reducing fouling or clogging of the membrane increases the efficiency and decreases the cost of operating the bioreactor and filtration system. The efficiency is increased by preventing/reducing the need to clean or replace the filter membrane and by increasing the amount of effluent that can travel from the bioreactor through the membrane of the filtration system before maintenance. Further, cost is reduced because more effluent can pass through the membrane of the filtration system, less time is utilized cleaning or replacing the membrane, and the cost of cleaning or replacing the membranes is reduced/saved. Accordingly, the method for operating a bioreactor and a filtration system as disclosed herein provides for a more efficient and cost effective system for the cleaning of waste.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the scope of the equipment and methods described herein.

Reference will now be made in detail to various features of the present disclosure that are illustrated in the accompanying drawings. Wherever possible, the same reference numbers will be used throughout the drawings to refer to the same or like parts.

FIG. 1 illustrates an embodiment of a system for treating biodegradable waste 100. The system for treating biodegradable waste 100, such as contaminated water, comprises a bioreactor 102 and filtration system 104. The bioreactor 102 and the filtration system 104 may be one unit or two separate units. Further, the bioreactor 102 and the filtration system 104 may be a portion or part of a multiunit waste treatment system 106. In one embodiment, the bioreactor 102 and the filtration system 104 may be a portion of a multiunit waste treatment system 106, such as the one disclosed in U.S. application Ser. No. 11/685,663, published on Mar. 6, 2008 (Publication No. 2008/0053896) which is hereby incorporated herein by reference.

A bioreactor 102 contains an aqueous suspension of live microorganisms which have been especially acclimated to ingest the waste fluids as nutrients, albeit with the deliberate addition of other "added" nutrients such as phosphate and nitrogenous compounds. The nutrient value of the waste fluids is typically so poor as to require continuous addition of the added nutrients to help the microorganisms ingest the waste fluids. One commonly added nutrient is iron.

The normal, or stoichiometric requirement for iron in a bioreactor is a function of the microorganism growth rate that results from the digestible feed coming into the bioreactor and the food to mass ratio of the biologic system. Approximately 1% of the microorganism yield on a dry basis will be constituted from iron used for microorganism cell production. Approximately 80% of the live microorganism mass is water. Therefore, the stoichiometric iron requirement can be expressed as:

Stoichiometric amount of iron required=net feed rate× (microorganism mass yield/mass net food)×20% dry mass/mass live microorganisms×0.01 mass iron/dry mass microorganism.

An example, utilizing this equation, is a bioreactor with a net feed concentration of 1 g/l edible food in the feed stream with a food to mass ratio of the biologic system equal to 0.1 g microorganism/g net food. Accordingly, the iron requirement for microorganism production or the stoichiometric requirement of iron for this bioreactor is 0.0002 g iron/gram of net food (i.e. 1×(0.1)×0.20×0.01=0.0002). In addition to iron, other nutrients such as sulfur and phosphorus may be added to maintain a population density of microorganisms.

After treatment in the bioreactor 102, the biomass of microorganisms must be removed from the treated water to generate the effluent 110. The filtration system 104 is designed to remove the biomass from the water by passing the water through one or more membranes or other filter media. The filtration system 104 is further designed with the intent that the biomass not be trapped on the membranes but rather continuously removed in a recycle stream 108 that is fed back into the bioreactor.

In practice, however, at least some of the biomass of the microorganisms stick to the membrane or membranes of the filtration system 104 as the effluent of the bioreactor 102 passes through the membrane or membranes of the filtration system 104. The microorganisms cause the membranes to clog or foul. This clogging or fouling reduces the amount of effluent that passes through the membrane and eventually reduces the flow of effluent to such an extent that a back-pulsing operation must be performed to remove the biomass of microorganisms and/or filtrate from the membrane. The process of back-pulsing takes time and, therefore, decreases the overall efficiency of the system when considered in terms of average throughput/day. This decrease in efficiency increases the unit cost of operating the bioreactor 102 and the filtration system 104.

As described herein, by utilizing excess iron in the system the resulting biomass is of such a different consistency that the biomass has less of an affinity to the membranes and is more likely to be removed with the recycle stream 108 as intended. Thus, there is relatively less membrane fouling and the period between back-pulsing operations is increased, thereby increasing the overall efficiency of the bioreactor.

Figure 2:
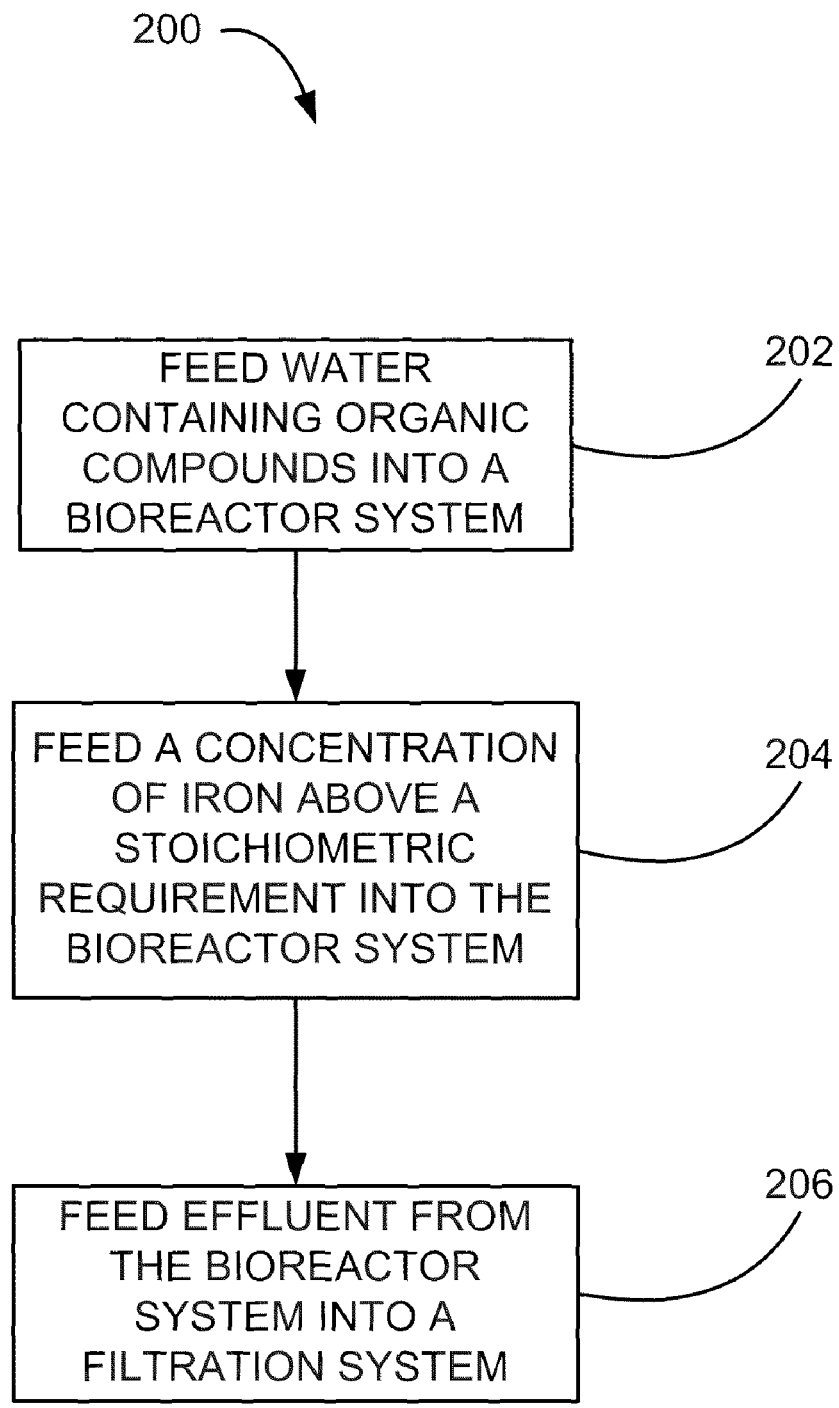
FIG. 2 illustrates an embodiment of a method for operating a bioreactor and a filtration system according to the principles of the present disclosure.

FIG. 2 illustrates a method 200 for operating a bioreactor and filtration system using excess iron. Method 200 feeds water containing contaminants into a bioreactor comprising microorganisms 202. The contaminants may be waste generated by humans and/or other animals, industrial process wastes, and/or a subsurface environment. In one embodiment, the water containing contaminants is produced water. In another embodiment, the contaminants include methanol, ethanol, and/or any other trace alcohols.

Method 200 feeds a concentration of iron above a stoichiometric requirement into the bioreactor system 204. The bioreactor system includes at least a first bioreactor. In another embodiment, the bioreactor system includes two or more bioreactors.

In one embodiment, step 204 feeds an iron concentration into the first bioreactor of the bioreactor system of about 150% to about 10,000% above the normal or stoichiometric requirement of iron for the bioreactor. In another embodiment, step 204 feeds an excess iron concentration by utilizing 150% to 600% above the normal concentration of iron for the first bioreactor. In yet another embodiment, step 204 feeds an excess iron concentration by utilizing 200% to 500% above the normal concentration of iron for the first bioreactor. In a further embodiment, step 204 feeds an excess iron concentration by utilizing 1000% to 4000% above the normal concentration of iron for the first bioreactor. In an additional embodiment, step 204 feeds an excess iron concentration by utilizing 200% to 2000% above the normal concentration of iron for the first bioreactor. In yet another embodiment, step 204 feeds an excess iron concentration by utilizing 3000% to 7000% above the normal concentration of iron for the first bioreactor. In a further embodiment, step 204 feeds an excess iron concentration by utilizing 7000% to 10,000% above the normal concentration of iron for the first bioreactor. In an additional embodiment, step 204 feeds an excess iron concentration by utilizing 3000% above the normal concentration of iron for the first bioreactor. In another embodiment, step 204 feeds an excess iron concentration by utilizing 200% to 2000% above the normal concentration of iron for the first bioreactor.

In practice, the amount of excess iron added may be determined based on a balancing of the improvement in performance of the bioreactor/filtration system with the negative impacts to downstream treatment systems due to the increased concentration of the non-iron component of the iron salt being added and the increased concentration of iron (if any). In one embodiment, the iron may be added in a divalent form. The divalent form of iron may include iron sulfate and/or iron chloride.

In one embodiment, the bioreactor system may comprise a first bioreactor and a second bioreactor. In one embodiment, the second bioreactor is fed an iron concentration equal to the first bioreactor. In another embodiment, the second bioreactor is fed an iron concentration similar to the first bioreactor. In yet another embodiment, the second bioreactor is fed an iron concentration different from the first bioreactor.

For example, the second bioreactor may be fed a concentration of iron from 150% to 10,000% above the normal concentration of iron for the second bioreactor. In another embodiment, the second bioreactor is fed a concentration of iron from 200% to 500% above the normal concentration of iron for the second bioreactor. In a further embodiment, the second bioreactor is fed a concentration of iron from 150% to 600% above the normal concentration of iron for the second bioreactor. In yet another embodiment, the second bioreactor is fed a concentration of iron from 2000% to 4000% above the normal concentration of iron for the second bioreactor. In an additional embodiment, the second bioreactor is fed a concentration of iron from 3000% to 5000% above the normal concentration of iron for the second bioreactor. In another embodiment, the second bioreactor is fed a concentration of iron from 5000% to 10,000% above the normal concentration of iron for the second bioreactor. In another embodiment, the second bioreactor is fed an excess iron concentration by utilizing 200% to 2000% above the normal concentration of iron for the first bioreactor.

In this embodiment, the excess iron in the second bioreactor also results in a reduction in fouling of the filtration system when compared to the recommended, the stoichiometric, or the normally utilized concentration of iron for a bioreactor.

Method 200 feeds, directly or indirectly, the effluent from the bioreactor system into a filtration system 206. In experiments, it was shown that effluent of a bioreactor system with excess iron experienced significantly less fouling than a bioreactor with the stoichiometric requirement of iron even though both systems created approximately the same mass of microorganisms.

Without being tied to any particular theory, it is believed that the excess iron affects the affinity of the microorganisms to each other and the membranes such that microorganisms grown in excess iron are more likely to slough off the membrane than foul it. Without being tied to any particular theory, it is further believed that microorganisms absorb a substantial portion of the excess iron and somehow use or bind this excess iron as part of their colony growth. This explains why the addition of excess iron does not result in the expected increase in iron concentration in the effluent or the expected fouling of the downstream water treatments. The iron may be added as any divalent form such as iron sulfate or iron chloride. In one embodiment, iron chloride is utilized because the resulting chloride is more desirable over sulfate when considering the downstream treatment processes used (e.g., excess sulfate may cause scaling of downstream reverse osmosis membranes) and because the resulting chloride concentration does not have to be removed from the effluent of the current system. Accordingly, the method of operating the bioreactor and filtration system as disclosed herein reduces the membrane of the filtration system from clogging or fouling and reduces the need for back-pulsing. Method 200 may further be implemented on the system for treating biodegradable waste 100.

Microorganisms as used in a bioreactor are commercially available or may also be grown on site from native cultures. Several kinds of bacteria have been found to be effective in the bioreactor 102, such as the genera Pseudomonas, Zooglea, Achromobacter, Flavobacter, Nocardia, Bdellovibrio, and Mycobacter, normally all considered heterotrophic. In embodiments, these microorganisms can perform the bulk of the bio-stabilization. Autotrophic bacteria may also be present, such as Nitrosonomas and Nitrobacter, both nitrogen fixing. Further, several varieties of fungus, yeasts and protozoa may also be utilized in the bioreactor 102.

The bioreactor 102 may operate at atmospheric pressure. The bioreactor 102 may have a sparger through which air or oxygen is uniformly distributed throughout the reactor to maintain the microorganisms. The bioreactor 102 may further include a baffle means to improve contact between the waste fluids and the microorganisms. In another embodiment, a recycle stream from the bioreactor may be fed back into the system for treating biological waste 100 or the bioreactor 102.

The filtration system 104 may utilize a microfiltration unit and/or an ultrafiltration unit, the former having a pore size in the range from about 0.1 micrometers (about 3.937 microinches) to about 1 micrometers (about 39.37 microinches), and the latter having a pore size in the range from about 0.001 micrometers (about 0.03937 microinches) to about 0.1 micrometers (about 3.937 microinches), each removing suspended, or dissolved and suspended solids respectively in the corresponding size ranges. The filtration system 104 may also include or consist of a reverse osmosis unit.

In one embodiment, membranes for microfiltration are derived from poly(vinyl alcohol), polysulfone, polypropylene, nylon and the like, for example Zenon SJ. The same materials may be used to provide ultrafiltration membranes, for example a Zenon TAM membrane. In one embodiment, a recycle stream from the filtration system 104 may be fed back into the system for treating biological waste 100 or the bioreactor 102.

As illustrated, in an embodiment, the reject from the filtration system may be returned to the bioreactor 102. The amount returned may be a function of the effluent/permeate 110 of the filtration system 104. For example, in an embodiment the recycle stream 108 returned to the bioreactor 102 may be about 4 to 5 times the amount of the filtered effluent/permeate 110 exiting the filtration system 104.

In one embodiment, the bioreactor 102 and filtration system 104 may be utilized for the biological digestion of methanol from a water treatment system and method. The biological digestion drastically reduces the concentration of the methanol in the water. In another embodiment, the biological digestion drastically reduces the concentration ethanol and/or any other trace alcohols in the water. In an embodiment, the biological digestion is performed for a duration sufficient to reduce the methanol to below the target discharge limit or alternatively to a level at which the methanol can no longer be detected.

In one embodiment, two stages of biological digestion may be performed. First, a bioreactor A may be used to perform the majority of the biological digestion. In an embodiment, the bioreactor may be an enclosed vessel, such as a steel tank with internal epoxy coating and standard tank roof with appropriate vents. Coarse bubble diffusers may be mounted on the bottom of the tank with air supplied by compressors. The bioreactor A may or may not be heated as needed to maintain a healthy biological environment for digestion. Additionally, nutrients may be added, such as gaseous ammonia for nitrogen and iron, as necessary. In an embodiment, a residence time may be chosen so that methanol is completely eliminated or reduced to a desired concentration in the bioreactor A. The design and operation of bioreactors are well known in the art and any suitable design may be utilized as part of this operation.

In this embodiment, a second stage of combined biological digestion and filtration is provided in which the effluent of the bioreactor A is transferred to a membrane bioreactor (MBR) B. The MBR B provides additional biological digestion as well as removing by filtration some contaminants contributing to the total organic carbon concentrations in the water. Cleaned water may be extracted through the membranes of the MBR B. In an embodiment, reject from the MBR B may be returned to the bioreactor A for additional digestion or to any other prior treatment stage. Any suitable membrane bioreactor design may be utilized, for example, a hollow fiber membrane bioreactor such as that sold by ZENON under the trademark ZEEWEED is suitable for use as the MBR B.

In another embodiment, one stage of biological digestion may be performed. A membrane bioreactor may be utilized to perform the majority of the biological digestion as well as removing by filtration some contaminants contributing to the total organic carbon concentrations in the water. Cleaned water may be extracted through the membranes of the MBR B.

While various embodiments have been described, various changes and modifications may be made which are well within the scope of the present disclosure. For example, various feed flow rates, microorganisms, filtration pore sizes, and types of contaminated water may be utilized, numerous other changes may be made which will readily suggest themselves to those skilled in the art and which are encompassed in the spirit of the disclosure and as defined in the appended claims.

The above specification provides a complete description of the present invention. Since many embodiments of the invention can be made without departing from the spirit and scope of the invention, certain aspects of the invention reside in the claims hereinafter appended.

What is claimed is:

1. A method of operating a bioreactor and filtration system that reduces the fouling of the filtration system comprises:
feeding water containing contaminants into a bioreactor system containing live microorganisms, the bioreactor system comprising at least a first bioreactor;
feeding a concentration of iron into the first bioreactor above a stoichiometric requirement for iron in the first bioreactor; and
treating, directly or indirectly, effluent from the bioreactor system with a filtration system to obtain a filtration system effluent substantially free of the contaminants,
wherein the concentration of iron above the stoichiometric requirement fed into the first bioreactor results in a reduction in fouling of the filtration system when compared to utilizing the stoichiometric requirement for iron in the first bioreactor.

2. The method of claim 1, wherein the contaminants are generated by at least one of a human, an animal, an industrial process, and a subsurface environment.

3. The method of claim 1, wherein iron is added in a divalent form.

4. The method of claim 1, wherein the microorganisms are bacteria and at least one of fungus, yeast, and protozoa.

5. The method of claim 1, wherein the contaminants include methanol.

6. The method of claim 1, further comprising:
feeding effluent from the first bioreactor into a second bioreactor containing live microorganisms; and
feeding a concentration of iron into the second bioreactor above the stoichiometric requirement for iron in the second bioreactor,
wherein the concentration of iron above the stoichiometric requirement fed into the second bioreactor results in a reduction in fouling of the filtration system when compared to utilizing the stoichiometric requirement for iron in the second bioreactor.

7. A method of operating a bioreactor and filtration system that reduces the fouling of the filtration system comprises:
feeding water containing contaminants into a bioreactor system containing live microorganisms, the bioreactor system comprising at least a first bioreactor;
feeding a concentration of iron into the first bioreactor from 150% to 10,000% above a stoichiometric requirement for iron in the first bioreactor; and
treating, directly or indirectly, effluent from the bioreactor system with a filtration system to obtain a filtration system effluent substantially free of the contaminants,
wherein the concentration of iron above the stoichiometric requirement fed into the first bioreactor results in a reduction in fouling of the filtration system when compared to utilizing the stoichiometric requirement for iron in the first bioreactor.

8. The method of claim 7, wherein the step of feeding the concentration of iron into the bioreactor comprises utilizing from 150% to 6000% above the stoichiometric requirement for iron in the first bioreactor.

9. The method of claim 7, wherein the step of feeding the concentration of iron into the bioreactor comprises utilizing from 200% to 500% above the stoichiometric requirement for iron in the first bioreactor.

10. The method of claim 7, wherein the step of feeding the concentration of iron into the bioreactor comprises utilizing from 2000% to 4000% above the stoichiometric requirement for iron in the first bioreactor.

11. The method of claim 7, wherein the step of feeding the concentration of iron into the bioreactor comprises utilizing from 3000% to 5000% above the stoichiometric requirement for iron in the first bioreactor.

12. The method of claim 7, wherein the step of feeding the concentration of iron into the bioreactor comprises utilizing from 5000% to 10,000% above the stoichiometric requirement for iron in the first bioreactor.

13. The method of claim 7, further comprising:
feeding effluent from the first bioreactor into a second bioreactor containing live microorganisms; and
feeding a concentration of iron into the second bioreactor from 150% to 10,000% above the stoichiometric requirement for iron in the first bioreactor,
wherein the concentration of iron above the stoichiometric requirement fed into the second bioreactor results in a reduction in fouling of the filtration system when compared to utilizing the stoichiometric requirement for iron in the first bioreactor.

14. The method of claim 7, further comprising:
feeding effluent from the first bioreactor into a second bioreactor containing live microorganisms; and
feeding a concentration of iron into the second bioreactor from 200% to 500% above the stoichiometric requirement for iron in the first bioreactor,
wherein the concentration of iron above the stoichiometric requirement fed into the second bioreactor results in a reduction in fouling of the filtration system when compared to utilizing the stoichiometric requirement for iron in the first bioreactor.

15. The method of claim 7, wherein the contaminants are generated by at least one of a human, an animal, an industrial process, and a subsurface environment.

16. The method of claim 7, wherein iron is added in a divalent form.

17. The method of claim 7, wherein the microorganisms are bacteria and at least one of fungus, yeast, and protozoa.

18. The method of claim 7, wherein the contaminants include methanol.

19. The method of claim 7, further comprising
feeding effluent from the first bioreactor into a second bioreactor containing live microorganisms; and
feeding a concentration of iron into the second bioreactor from 200% to 2000% above the stoichiometric requirement for iron in the first bioreactor,
wherein the concentration of iron above the stoichiometric requirement fed into the second bioreactor results in a reduction in fouling of the filtration system when compared to utilizing the stoichiometric requirement for iron in the first bioreactor.

* * * * *